(12) United States Patent
Buonasera et al.

(10) Patent No.: US 7,805,739 B2
(45) Date of Patent: Sep. 28, 2010

(54) METHODS AND APPARATUS FOR INDIRECT ILLUMINATION IN ELECTRONIC MEDIA RATING SYSTEMS

(75) Inventors: John William Buonasera, Largo, FL (US); Christen Voss Nielsen, Palm Harbor, FL (US); Venugopal Srinivasan, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 0 days.

(21) Appl. No.: 12/606,889

(22) Filed: Oct. 27, 2009

(65) Prior Publication Data

US 2010/0045972 A1    Feb. 25, 2010

Related U.S. Application Data

(63) Continuation of application No. 11/916,511, filed as application No. PCT/US2005/020128 on Jun. 8, 2005, now Pat. No. 7,631,324.

(51) Int. Cl.
    *H04N 60/33*    (2006.01)
(52) U.S. Cl. .................... 725/12; 725/9; 725/10
(58) Field of Classification Search ........... 725/9, 725/20, 23
    See application file for complete search history.

(56) References Cited

U.S. PATENT DOCUMENTS

| | | |
|---|---|---|
| 4,644,509 A | 2/1987 | Kiewit et al. |
| 4,769,697 A | 9/1988 | Gilley et al. |
| 4,849,737 A | 7/1989 | Kirihata et al. |
| 4,858,000 A | 8/1989 | Lu |
| 5,031,228 A | 7/1991 | Lu |
| 5,136,312 A | 8/1992 | Weaver et al. |
| 5,287,134 A | 2/1994 | Cocca |
| 5,315,342 A | 5/1994 | Cocca |
| 5,315,422 A | 5/1994 | Utaka et al. |
| 5,384,716 A | 1/1995 | Araki et al. |
| 5,392,090 A | 2/1995 | Stephenson, III |
| 5,550,928 A | 8/1996 | Lu et al. |
| 5,771,307 A | 6/1998 | Lu et al. |
| 5,793,409 A | 8/1998 | Tetsumura |

(Continued)

FOREIGN PATENT DOCUMENTS

CA    2110866    12/1993

(Continued)

OTHER PUBLICATIONS

International Searching Authority, "International Search Report" corresponding to International Application No. PCT/US2005/020128, mailed Mar. 12, 2007 (3 pages).

(Continued)

*Primary Examiner*—Hunter B. Lonsberry
(74) *Attorney, Agent, or Firm*—Hanley, Flight & Zimmerman, LLC (57) ABSTRACT

Methods and apparatus for indirect illumination in electronic media rating systems are disclosed. A disclosed example method includes reflecting infrared light off of a room ceiling to indirectly illuminate the audience member, receiving reflections of the indirect illumination off of the audience member, blocking visible light prior to receiving the reflections of the indirect illumination off of the audience member, and processing the received reflections to detect the audience member.

6 Claims, 7 Drawing Sheets

U.S. PATENT DOCUMENTS

| | | |
|---|---|---|
| 6,350,031 B1 | 2/2002 | Lashkari et al. |
| 6,774,369 B2 | 8/2004 | Haufe |
| 6,824,317 B2 | 11/2004 | Finizio et al. |
| 6,889,382 B1 | 5/2005 | Anderson |
| 7,088,525 B2 | 8/2006 | Finizio et al. |
| 2002/0168186 A1 | 11/2002 | Jeudi |
| 2004/0183775 A1 | 9/2004 | Bell |
| 2005/0034147 A1 | 2/2005 | Best, Jr. et al. |

FOREIGN PATENT DOCUMENTS

| | | |
|---|---|---|
| CA | 2306095 | 6/1998 |
| EP | 0358911 | 3/1990 |
| WO | 2004/054255 | 6/2004 |

OTHER PUBLICATIONS

International Searching Authority, "Written Opinion" corresponding to International Application No. PCT/US2005/020128, mailed Mar. 12, 2007 (5 pages).

International Preliminary Examining Authority, "International Preliminary Report on Patentability," for counterpart PCT Application Serial No. PCT/US2005/20128 mailed on Apr. 1, 2008 (4 pages).

United States Patent and Trademark Office, "Office Action" issued in connection with U.S. Appl. No. 11/916,511, mailed Mar. 23, 2009 (11 pages).

United States Patent and Trademark Office, "Notice of Allowabilty" issued in connection with U.S. Appl. No. 11/916,511, mailed Aug. 20, 2009 (3 pages).

METHODS AND APPARATUS FOR INDIRECT ILLUMINATION IN ELECTRONIC MEDIA RATING SYSTEMS

RELATED APPLICATION

This patent arises from a continuation of U.S. patent application Ser. No. 11/916,511, entitled "Methods and Apparatus for Indirect Illumination in Electronic Media Rating Systems," which was filed on Jul. 2, 2008. U.S. patent application Ser. No. 11/916,511 is the U.S. national stage of PCT Application Serial No. PCT/US2005/020128, which was filed on Jun. 8, 2005. Both U.S. patent application Ser. No. 11/916,511 and PCT Application Serial No. PCT/US2005/020128 are hereby incorporated by reference in their entirety.

FIELD OF THE DISCLOSURE

This disclosure relates generally to electronic media rating systems, and, more particularly, to methods and apparatus for indirect illumination in electronic media rating systems.

BACKGROUND

A price that can be charged for advertising time during a media presentation is principally affected by a size of a potential viewing audience of the media event or show, as well as the demographics of the potential audience. It is generally recognized that a large audience will view significant sporting events (e.g., The Superbowl, World Cup soccer, etc.). However, knowledge of the audience size for other types of televised events or shows is more difficult to ascertain.

Figure 1:
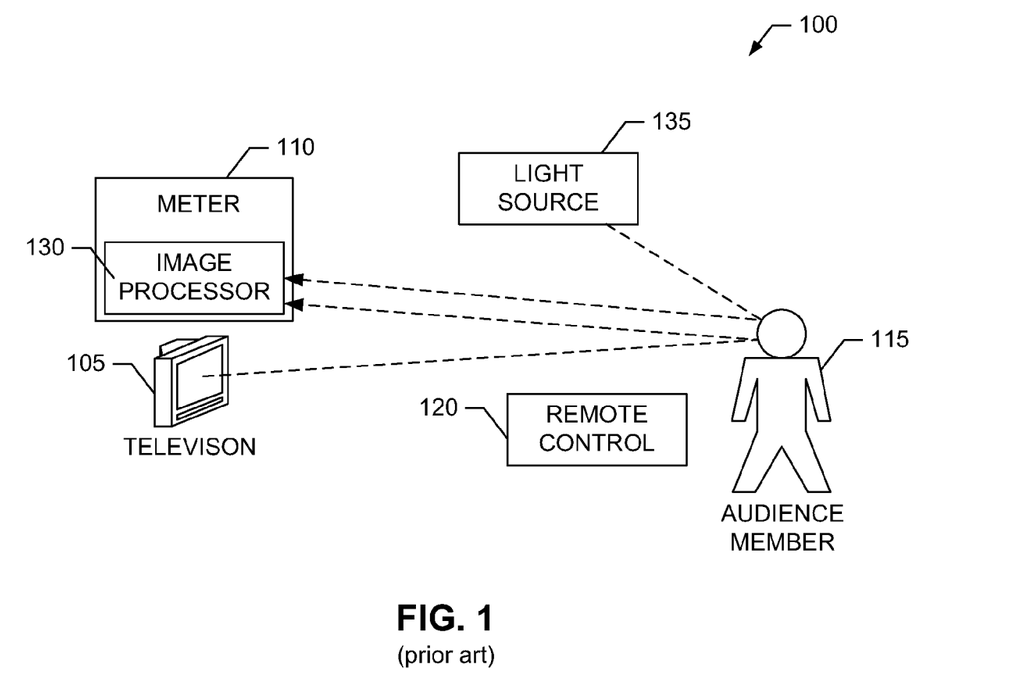
FIG. 1 is a schematic illustration of an example prior-art electronic media rating system.

Typically, recorded past historical media consumption (e.g., television viewing, radio listening, etc.) is used to estimate future media consumption. FIG. 1 illustrates a prior-art example electronic media rating system 100 that measures viewership for media events or shows displayed on an information presenting device such as a television 105. To measure the viewership, the example electronic media rating system 100 includes a meter 110 (e.g., the Nielsen People Meter™ from Nielsen Media Research®) that records events or shows viewed by an audience member 115. In a known example, the meter 110 determines which televised events or shows are viewed by the audience member 115 by receiving signals from a remote control 120 that the audience member 115 uses to select events or shows. The meter 110 records and stores a list of tuned channels and times. The list is subsequently processed (together with lists gathered from other meters (not shown)) by, for example, compiling the gathered data against a schedule of programs to identify the tuned program and to determine statistics that characterize the viewership for individual televised events, individual televised shows, portions of days, portions of weeks, etc.

For locations in which more than one potential audience member may be present, the meter 110 can, in addition to recording the selected events and shows, record which audience member(s) were present during a selected event or show. The meter 110 can determine a presence of the audience member 115 by, for example, receiving signals from the remote control 120, or another remote device, that identify the audience member 115. For example, the audience member 115 could press one or more buttons on the remote 120 or directly on the meter 110 to identify themselves. In a known example, the meter 110 occasionally prompts the audience member 115 to signal their identification.

In some known examples, the meter 110 uses image recognition techniques to detect the presence of the audience member(s) 115. To perform the image recognition techniques, the meter 110 includes an image processor 130 that is responsive to visible light reflected off of the audience member(s) 115. The visible light might be created by the television 105 or by another visible light source 135 (e.g., a lamp, a light fixture, a window, a candle, etc.) present in a room. Using one or a variety of well-known techniques, the image processor 130 captures signals representative of the reflected light and applies appropriate signal processing to the captured signals to identify a number of audience members present. In some examples, the image processor 130 may be capable to distinguish the audience member(s) 115 such that the identities of the audience member(s) 115 can be electronically determined and recorded.

The signal capture and processing performed by the image processor 130 is significantly complicated in circumstances when the audience member(s) 115 are viewing an information presenting device such as a television 105 in a darkened room. Such circumstances can increase noise present in the captured signals, cause image contrast problems, increase shadows (e.g., shadows caused by a single non-diffused light source), etc. Further, scene changes during the televised event or show can cause significant variations in intensity of the reflected light. All of these conditions can reduce the effectiveness and accuracy of audience member detection and identification performed by the image processor 130.

As discussed above, the accuracy of image recognition based audience member detection and identification is typically dependent upon the quantity and quality of light present in the room being monitored. However, it is undesirable and impractical that the prior-art example electronic media rating system 100 either require the audience member(s) 115 to watch television with lights turned on, or watch with a specific arrangement of visible light sources to improved the effectiveness of the image recognition system. Such requirements could significantly reduce compliance of the participating audience member(s) 115, and could potentially reduce the number of willing participants in media exposure studies, thereby reducing the statistical accuracy of resultant media exposure ratings.

It is well known in photography, that indirect illumination provides illumination that is more uniform (i.e., substantially equal illumination spread across an area) and less prone to wash out details (i.e., to cause strong highlights that obscure details) in a scene being photographed.

DETAILED DESCRIPTION

Figure 2:
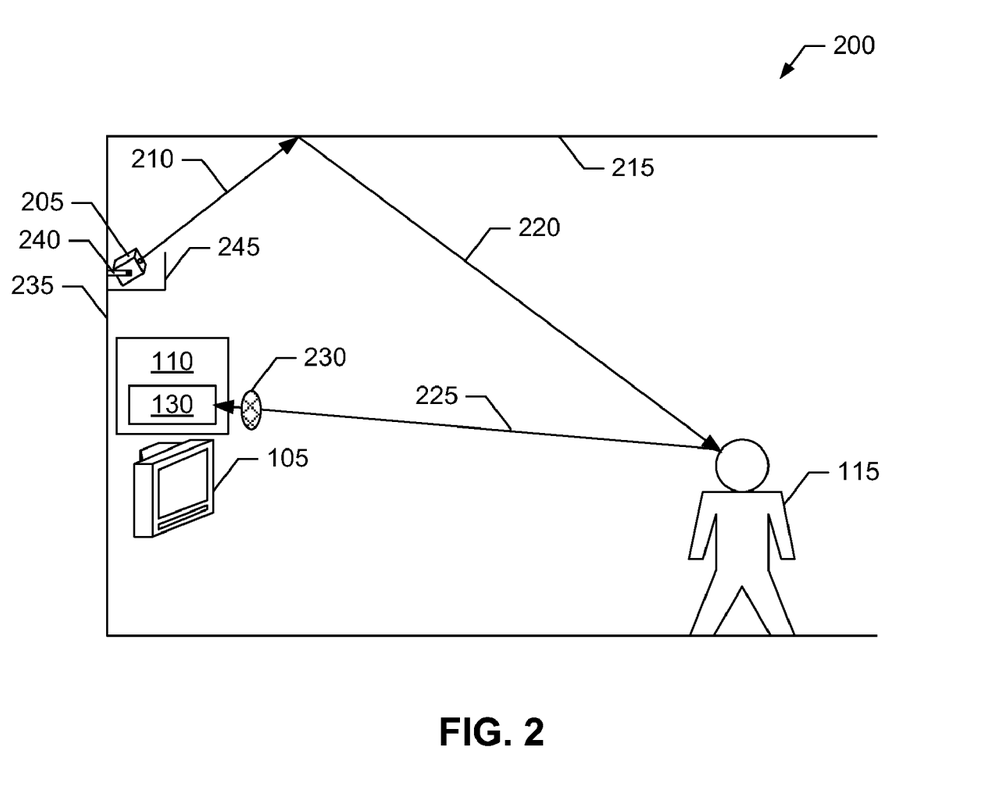
FIG. 2 is a schematic illustration of an example illumination system constructed in accordance with the teachings of the invention.

FIG. 2 illustrates an example electronic media rating system 200 constructed in accordance with the teachings of the invention. To provide safe indirect illumination, the example electronic media rating system 200 of FIG. 2 includes an illumination source 205 emitting light 210 that is reflected off of a ceiling 215 of a room, thereby causing indirect illumination 220 of the audience member(s) 115. Reflection(s) 225 of the indirect illumination 220 off of the audience member(s) 115 are captured and processed by the image processor 130 to detect and/or identify the audience member 115. To reduce or obviate perception of the indirect illumination 220 by the audience member(s) 115, the illumination source 205 emits light 210 that is not visible to humans (i.e., non-visible light). In the illustrated example of FIG. 2, the illumination source 205 emits infrared light and a light filter 230 that passes infrared light and blocks visible light is placed in front of the image processor 130. In an example, the light filter 230 is implemented within the meter 110 and, as discussed below, is configurable to be bypassed.

The example illumination source 205 of FIG. 2 is designed to ensure the safety of the audience member(s) 115. For example, the illumination source 205 may be implemented by the EX12LED from Extreme CCTV Surveillance System which has been tested and certified safe, even when used for direct illumination. By using a certified safe illumination source 205, the audience member(s) 115 are assured that the indirect illumination 220 provided by the illumination source 205 will not have any known harmful health effects. The example illumination source 205 of FIG. 2 emits infrared light that spreads out in a cone-shaped pattern, thus, providing indirect illumination of a portion of the room in which the audience member(s) 115 are most likely to be located when consuming media programs on the information presenting device.

The illumination source 205 may emit light continuously or intermittingly. Further, the times at which light is emitted may be tied to certain events. For instance, the illumination source 205 emits infrared light continuously whenever the meter 110 is operational. Alternatively, the illumination source 205 can be operated to only emit infrared light while the image processor 130 is operational (e.g., while the image processor 130 is idle, capturing signals, or processing signals). In another example, the illumination source 205 emits infrared light only when the image processor 130 is capturing signals. In a further example, the illumination source 205 emits infrared light only when a sensor (not shown) associated with the meter 110 detects that insufficient ambient room light is available for reliable metering. In such an example, the image processor 130 may receive an output of a visible light measuring device (e.g., a photo cell detector). If more than a predetermined threshold amount of ambient room light is available, the image processor 130 configures the illumination source 205 to not emit light and bypasses the light filter 230 so that the image processor 130 can receive visible light. When insufficient ambient light is available the image processor 130 activates the illumination source 205 and the light filter 230. Persons of ordinary skill in the art will appreciate that there are numerous ways to determine if sufficient ambient room light is present for reliable metering. The image processor 130 can use a metric (e.g., signal noise) from an image processing algorithm executing on the image processor 130 to determine if sufficient ambient room light is available.

Different materials used to construct the ceiling 230 may affect an intensity of the indirect illumination 220 created by the illumination source 205. In the example of FIG. 2, an intensity of the illumination source 205 is determined based on a worst case ceiling material (i.e., a ceiling material that reflects the least amount of light) and a maximum safe intensity level. In an example, a single intensity is used for all rooms and all ceiling material types. Alternatively, the intensity may be adjusted for each room and/or ceiling material type. For example, the image processor 130 can use a metric (e.g., signal noise) from an image processing algorithm executing on the image processor 130 to determine a necessary indirect illumination intensity, and accordingly adjust the intensity of the illumination source 205. The intensity should not be adjusted or set to a level in excess of a safe illumination intensity level.

To allow the illumination source 205 of the example of FIG. 2 to more easily blend in with furnishings located in the room, the illumination source 205 is mounted to a wall 235 (using a mounting bracket 240) behind a cover 245 (e.g., a wall sconce). For aesthetic reasons, and as discussed in further detail below in connection with FIG. 3, the illumination source 205 and the cover 245 are mounted high enough on the wall 235 to prevent the audience member 115 from seeing the illumination source 205. It will be readily apparent to persons of ordinary skill in the art that the cover 245 is provided for aesthetic reasons, and could be omitted without affecting the indirect illumination 220 provided by the illumination source 205 and the mounting bracket 240.

As discussed below in connection with FIG. 4, the mounting bracket 240 allows an angle θ 402 of the illumination source 205 to be adjusted, thereby, adjusting a portion of the room illuminated by the indirect illumination 220. Further, the mounting bracket 240 allows the angle θ of the illumination source 205 to be secured against accidental change and/or change due to vibration(s) of the illumination source 205.

Figure 3:
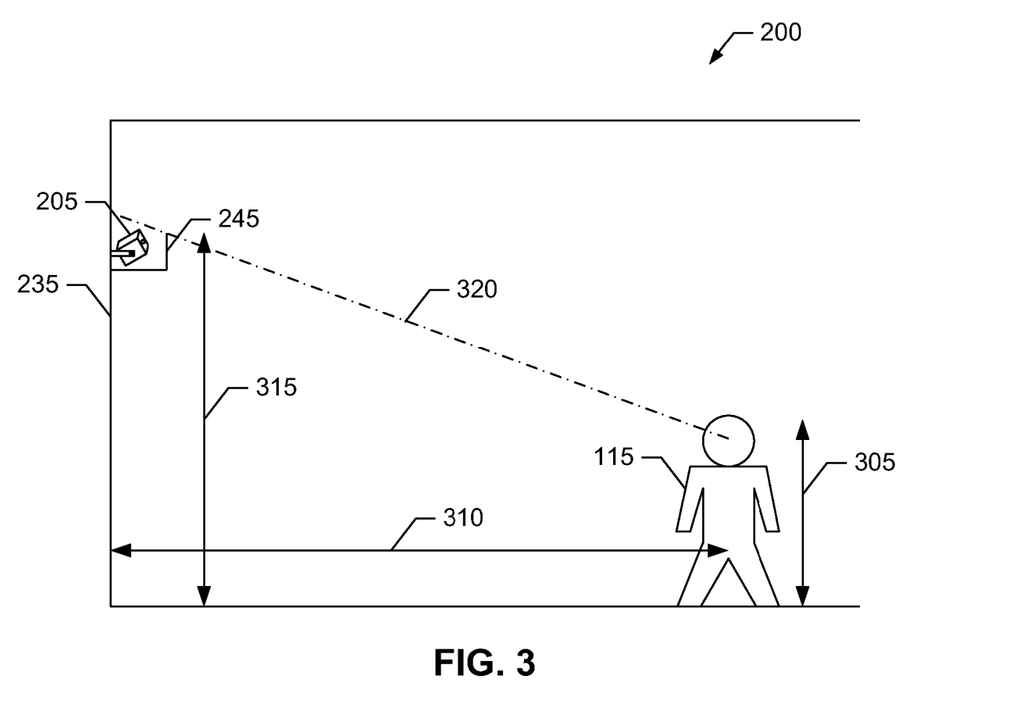
FIG. 3 is a diagram illustrating an example placement height for an indirect illuminator (shown in FIG. 2).

FIG. 3 illustrates an example height at which the illumination source 205 is mounted to obscure observation of the illumination source 205 by the audience member 115. Given a maximum height 305 of the expected audience member(s) 115 (e.g., 7 feet) and a maximum distance 310 from the illumination source 205 to the audience member(s) 115 (e.g., the largest dimension of the room), the minimum mounting height 315 of the illumination source 205 can be selected. In particular, the minimum mounting height 315 is chosen such that a line of sight (illustrated by the line 320) is blocked by the front surface of the cover 245 from intersecting the illumination source 205. For example, if the illuminator 205 is mounted behind the cover 245 such that no portion of the illuminator 205 is located higher than the front surface of the cover 245, then the illuminator 205 and the cover 245 can be mounted at the maximum height 305. The material and colors used to construct the surface 245 can be chosen to help further reduce perception of the illuminator 205.

Figure 4:
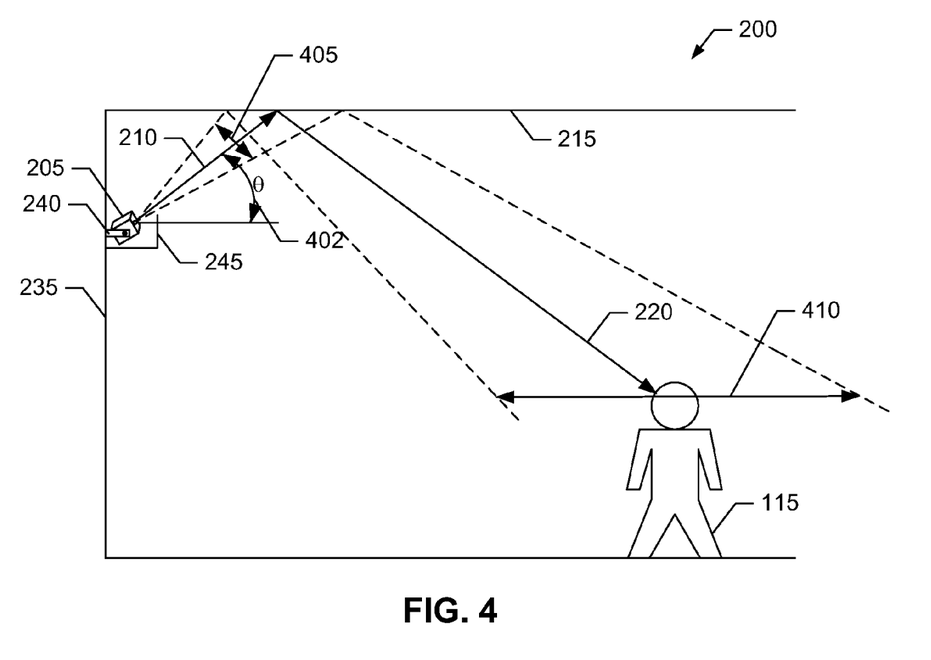
FIG. 4 is a diagram illustrating an example illumination angle for an indirect illuminator (shown in FIG. 2).

FIG. 4 illustrates an example manner of indirectly illuminating a portion of an example room. As discussed earlier, the illumination source 205 emits infrared light that spreads out from the illumination source 205 in a cone-shaped pattern. The pattern of infrared illumination 210 can be characterized by a spreading angle φ 405 centered on the centerline 210 of the emitted infrared light. The pattern of infrared illumination 210 is reflected off of the ceiling 215 causing indirect illumination of a portion of the room 410.

As dictated by trigonometric and optical principles, adjusting the angle θ 402 of the illumination source 205 relative to a horizontal plane adjusts the portion of the room 410 illuminated by the illumination source 205. For example, if the illumination source 205 is angled upwards at an angle of θ degrees with respect to horizontal and is located X feet below the ceiling 215, then the center line 210 of the illumination intersects the ceiling 215 at a point X tan(θ) feet from the illumination source 205 and at an angle of θ degrees (with respect to the surface of the ceiling). Further, as dictated by optical principles, the indirect illumination 220 leaves the intersection point at an angle of θ degrees (with respect to the surface of the ceiling). Finally, the indirect illumination 220 intersects a seating surface at a point Y/tan(θ) feet from the illumination source 205, where Y is a difference between a height of the ceiling 215 and a seating height (e.g., eye level) of the audience member(s) 115 seated on the seating surface. Similarly, knowing the spreading angle φ 405 of the illumination emitted by the illumination source 205, the illuminated portion 410 of the room can be determined. In particular, one edge of the pattern leaves the illumination source 205 at an angle of θ−φ/2 degrees and the other edge at an angle of θ+φ/2 degrees.

Given a ceiling height, a desired pre-determined indirect illumination region 410 (e.g., defined by an average seating height and an average distance from the seating surfaces to the illumination source 205), and a mounting height of the illumination source 205, and using techniques described above, an angle θ 402 of the illumination source 205 can be determined that indirectly illuminates the desired indirect illumination region 410. Alternately, rather than using the average distance from the illumination source 205 to the seating surfaces, the angle θ 402 of the illumination source 205 can be determined to illuminate a center portion of the room. Further, the angle θ 402 of the illumination source 205 can be determined to indirectly illuminate primary seating surfaces in the room. It should be readily apparent, to persons of ordinary skill in the art that an angle θ 402 and a mounting height of the illumination source 205 can be chosen to illuminate a desired indirect illumination region 410 within the physical constraints of the room in question.

Care must be taken when selecting relative heights of the illumination source 205 and the cover 245. For example, if the illumination source 205 is located below the top of the front surface of the cover 245, then a minimum angle θ (with respect to horizontal) of the illumination source 205 is greater than zero, and a maximum distance from the illumination source 205 to an indirect illumination region 410 that can be supported is correspondingly limited.

It will be readily apparent to persons of ordinary skill in the art, that the angle θ 402 of the illumination source 205 could be adaptively controlled (e.g., using a motor adapted to adjust the angle θ 402 of the illumination source 205 in response to control signals provided by the image processor 130) to allow the image processor 130 to adjust an intensity of the indirect illumination 220 present in different portions of the room. For example, if the image processor 130 detects that the audience member 115 is located closer to the television 105 than normal, the image processor 130 could adjust (by controlling the motor) the center of the indirect illumination region 410 closer to the television 105.

It will also be readily apparent to persons of ordinary skill in the art that in addition to, or instead of, adjusting the intensity of the illumination source 205 or adaptively controlling the angle θ 402 of the illumination source 205, the ceiling could be augmented to include a reflective surface. For example, the reflective surface could be placed at a pre-determined location on the ceiling so that when the non-visible light 210 is reflected off of the reflective surface near optimal indirect illumination 220 (e.g., illuminates a desired portion 410 with a desired intensity) of the room occurs. In one example, the reflective surface is selected to have better light reflection characteristics than the material used to construct the ceiling.

It will be readily appreciated that a viewing location may a have high (e.g., vaulted), obstructed (e.g., by beams, etc.), or absent (e.g., outdoors) ceiling. In such circumstances, a reflector could be used. In one example, the reflector is mounted above the illumination source 205 (e.g., using a second mounting bracket attached to the mounting bracket 240, or to the wall 235) and is angled with respect to a horizontal plane to cause the indirect illumination 220. In another example, the reflector is mounted to, or hanging from, a naturally occurring or man-made surface or structure located in the viewing location (e.g., a beam, a tree, a tree limb, a rock, an overhang, a post, etc.) and is positioned either horizontally or angled depending upon the relative positions of the illumination source 205 and the desired indirect illumination region 410.

Figure 5:
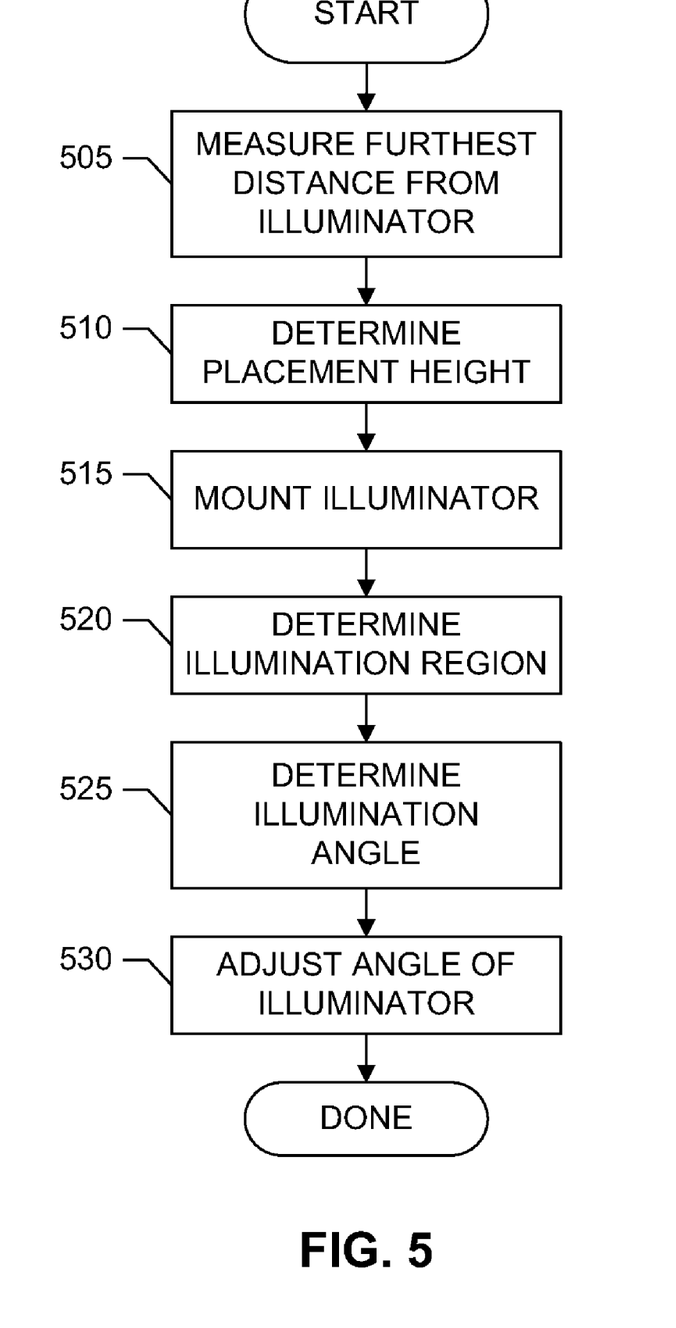
FIG. 5 is a flowchart illustrating an example adjustment process for an indirect illuminator (shown in FIG. 2).

FIG. 5 illustrates an example process for installing and configuring safe indirect illumination for electronic media rating systems. Although the example is described with reference to the example flowchart illustrated in FIG. 5, persons of ordinary skill in the art will readily appreciate that many other methods of implementing the process of FIG. 5 may be used. For example, the order of execution of the blocks may be changed, and/or some of the blocks described may be split, changed, eliminated, or combined.

The example process of FIG. 5 starts by measuring the distance to a furthest point from which the illumination source 205 can potentially be viewed (block 505). The placement height (for the illumination source 205 and the front surface of the cover 245) that obscures viewing of the illumination source 205 is then determined (block 510), and the illuminator source 205 and the front surface of the cover 245 are mounted to the wall 235 at the determined placement height (block 515). The desired indirect illumination region 410 (block 520) and a corresponding required angle θ 402 for the illumination source 205 are then determined (block 525). The angle θ 402 of the illumination source 205 is adjusted to match the corresponding required angle θ 402 and the illumination source 205 is secured against accidental change (block 530) to complete the process.

Figure 6:
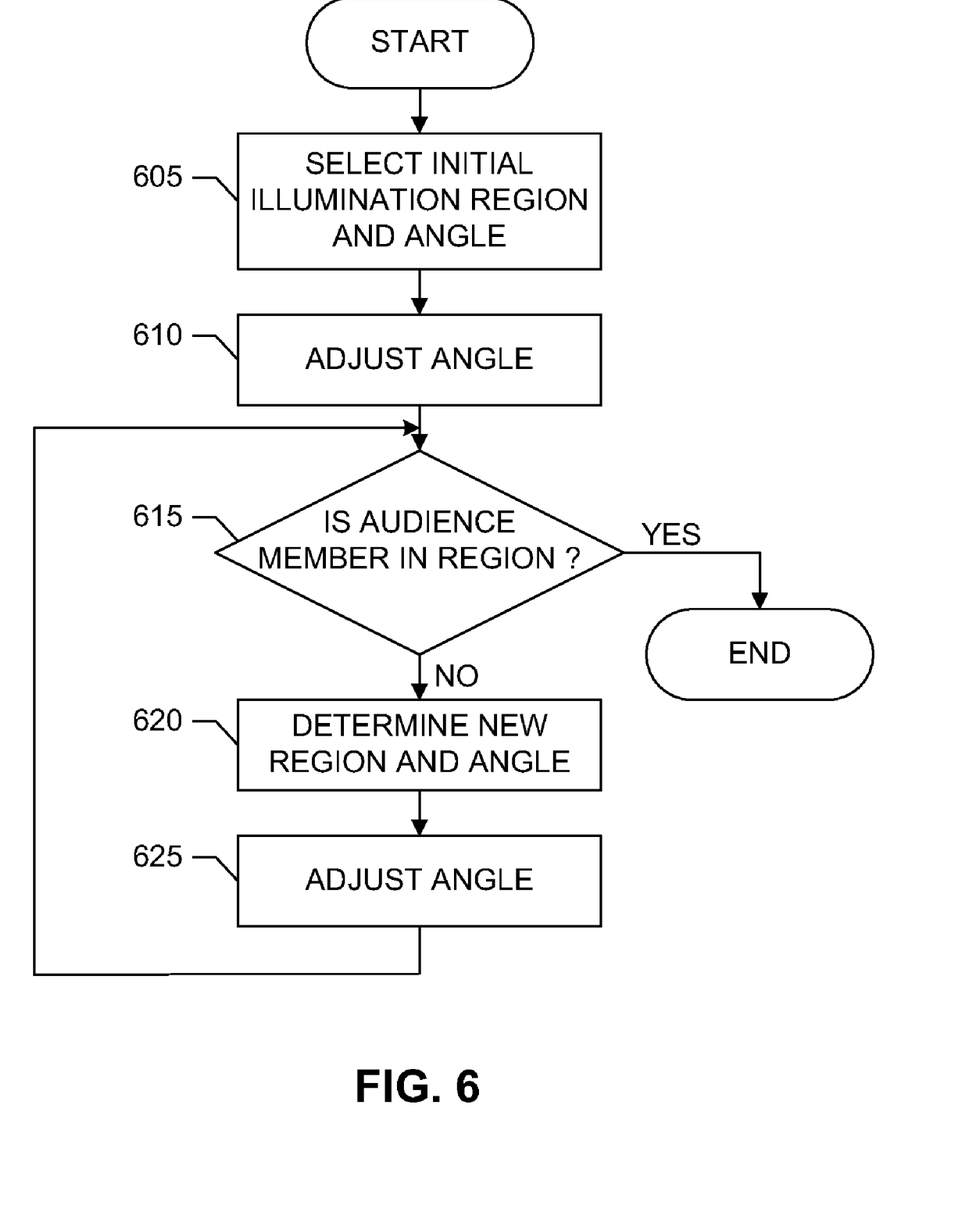
FIG. 6 is a flowchart representative of machine readable instructions which may be executed by an image processor (shown in FIG. 2) to adjust an illumination region.

FIG. 6 illustrates a flowchart representative of example machine readable instructions that may be executed by the example image processor 130 of FIG. 2 to adjust an illumination region. The machine readable instructions of FIG. 6 may be implemented by a processor, a controller, or any other suitable processing device. For example, the machine readable instructions of FIG. 6 may be embodied in coded instructions stored on a tangible medium such as a flash memory, or random-access memory (RAM) associated with the processor 710 shown in the example processor platform 700 discussed below in conjunction with FIG. 7. Alternatively, the machine readable instructions of FIG. 6 may be implemented using an application specific integrated circuit (ASIC), a programmable logic device (PLD), a field programmable logic device (FPLD), discrete logic, etc. Also, some portion(s) of the machine readable instructions of FIG. 6 may be implemented manually or as combinations of any of the foregoing techniques. Further, although the example machine readable instructions of FIG. 6 are described with reference to the flowchart of FIG. 6, persons of ordinary skill in the art will readily appreciate that many other methods of implementing an adjustment of the illumination region exist. For example, the order of execution of the blocks may be changed, and/or some of the blocks described may be changed, eliminated, or combined.

The example machine readable instructions of FIG. 6 begin when the image processor 130 selects an initial portion 410 (i.e., region) of the room to illuminate and determines a corresponding angle 402 of the illumination source 205 (block 605). The image processor 130 sends control signals to the motor to adjust the angle 402 of the illumination source 205 to the determined corresponding angle 402 (block 610). The image processor 130 determines if the audience member(s) 115 are located within the illuminated region 410 (block 615). The image processor 130 can determine if the audience member(s) 115 are located within the illuminated region 410 using any of a variety of well-known techniques. For example, by measuring the amount of light reflecting off of the audience member(s) 115 or determining a distance from the audience member(s) 115 and comparing the distance to the center of the illumination region 410. If the audience member(s) are within the illumination region 410, the image processor 130 ends the example machine readable instructions of FIG. 6. If the audience member(s) are not within the illumination region 410, the image processor 130 determines a new illumination region 410 and a new corresponding angle 402 (block 620). The processor 130 sends control signals to the motor to adjust the angle 402 of the illumination source 205 and returns to block 615.

It should be readily apparent to persons of ordinary skill in the art, that the example machine readable instructions of FIG. 6 may be repeated periodically to allow the illumination region 410 to track the movements of the audience member(s) 115. Further, the audience member(s) 115 may be sufficiently separated within the room such that a single illumination region 410 may not adequately illuminate all audience member(s) 115. In such circumstances, the image processor 130 may periodically or occasionally change the illumination region 410 to periodically or occasionally illuminate each audience member 115. Alternatively, the image processor 130 may set the illumination region 410 to best illuminate a majority of the audience member(s) 115 (e.g., set the illumination region 410 based on the primary seating surfaces in the room).

Figure 7:
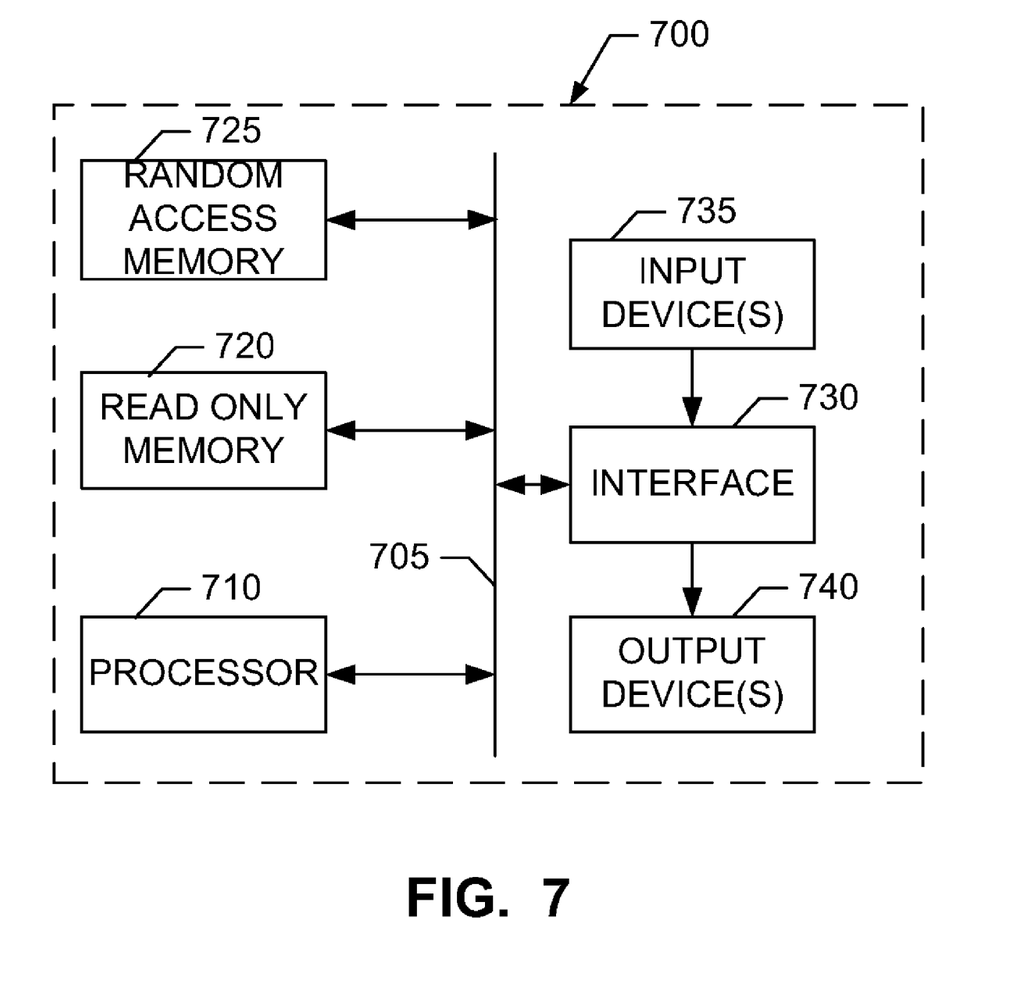
FIG. 7 is a schematic illustration of an example processor platform that may execute the example machine readable instructions represented by FIG. 6.

FIG. 7 is a block diagram of an example processor platform 700 capable of implementing the example machine readable instructions illustrated in FIG. 6. For example, the processor platform 700 can be implemented by one or more general purpose microprocessors, microcontrollers, etc.

The processor platform 700 of the example includes the processor 710 that is a general purpose programmable processor. The processor 710 executes coded instructions present in main memory of the processor 710. The processor 710 may implement, among other things, the example machine readable instructions illustrated in FIG. 6.

The processor 710 is in communication with the main memory including a read only memory (ROM) 720, a random access memory (RAM) 725 via a bus 705. The RAM 725 may be implemented by Synchronous Dynamic Random Access Memory (SDRAM), Dynamic Random Access Memory (DRAM), and/or any other type of random access memory device. The ROM 720 may be implemented by flash memory and/or any other desired type of memory device. Access to the memory space 720, 725 is typically controlled by a memory controller (not shown) in a conventional manner.

The processor platform 700 also includes a conventional interface circuit 730. The interface circuit 730 may be implemented by any type of well known interface standard, such as an external memory interface, serial port, general purpose input/output, etc.

One or more input devices 735 are connected to the interface circuit 730. One or more output devices 740 are also connected to the interface circuit 730. The output devices 740 may be used by the processor 710 to control the motor to adjust the angle 402 of the illumination source 205.

From the foregoing, persons of ordinary skill in the art will further appreciate that the above disclosed methods, apparatus, and articles of manufacture provide safe indirect illumination for electronic media rating systems. Although the examples discussed herein reference a television as the information presenting device 105, persons of ordinary skill in the art will appreciated that the information presenting device can be any media presenting device. For example, a television, a radio, a stereo, a computer, a digital video disc (DVD) player, a digital video recorder (DVR), etc.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method for improving accuracy in detecting an audience member, comprising:
   reflecting infrared light off of a room ceiling to indirectly illuminate the audience member;
   receiving reflections of the indirect illumination off of the audience member;
   blocking visible light prior to receiving the reflections of the indirect illumination off of the audience member; and
   processing the received reflections to detect the audience member.

2. A method as defined in claim 1, further comprising using an output of a light measuring device to control the indirect illumination.

3. A method as defined in claim 2, further comprising:
   turning off the indirect illumination when sufficient ambient room light is present;
   receiving reflections of ambient room light off of the audience member; and
   processing the ambient light reflections to detect the audience member.

4. A method as defined in claim 1, further comprising:
   receiving reflections of ambient room light off of the audience member; and
   processing the ambient light reflections to detect the audience member.

5. A method as defined in claim 1, further comprising adjusting an angle of the infrared light relative to the room ceiling.

6. A method as defined in claim 1, further comprising reflecting the infrared light off of the room ceiling at least one of constantly, periodically, or aperiodically.

* * * * *